(12) United States Patent
Hagirahim et al.

(10) Patent No.: US 6,937,598 B1
(45) Date of Patent: Aug. 30, 2005

(54) METHOD AND APPARATUS FOR TRANSPORTING ATM CELL TRAFFIC OVER IP NETWORKS

(75) Inventors: Hassan Hagirahim, Long Branch, NJ (US); Francis R. Waldman, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/400,609

(22) Filed: Sep. 20, 1999

(51) Int. Cl.[7] ............................................. H04L 12/64
(52) U.S. Cl. .................................. 370/356; 370/395.51
(58) Field of Search ................................ 370/351, 352, 370/353, 354, 389, 392, 395.1, 395.5, 395.51, 370/395.52, 395.53, 395.54, 395.6, 395.65, 370/401, 465, 466, 474, 356; 709/236

(56) References Cited

U.S. PATENT DOCUMENTS

| | | | | |
|---|---|---|---|---|
| 5,623,605 | A * | 4/1997 | Keshav et al. | 709/236 |
| 5,996,021 | A * | 11/1999 | Civanlar et al. | 709/238 |
| 6,195,714 | B1 * | 2/2001 | Li et al. | 710/31 |
| 6,331,978 | B1 * | 12/2001 | Ravikanth et al. | 370/392 |
| 6,339,594 | B1 * | 1/2002 | Civanlar et al. | 370/352 |
| 6,522,667 | B1 * | 2/2003 | Oda et al. | 370/474 |
| 2001/0055313 | A1 * | 12/2001 | Yin et al. | 370/466 |

OTHER PUBLICATIONS

Kowtha, Sitaram, May 24-27, 1999, ATM Workshop, 1999. IEEE Proceedings, Encapsulating ATM cells in TCP/IP for transport between ATM base backbone and end-user terminals, to enable real-time network-aware services, pp. 195-203.*

Phillip J. Tree, Department of Computer Science, University of Waikato. Network Simulation of IP and ATM over IP using a Discrete Event Simulator.*

Toga et al, Telecommunication Standardization Sector. Experts Group for Video Coding and Systems in ATM and other Network Environments.*

ITU-T Draft H.323 Line Transmission of Non-Telephone Signals, Visual Telephone Systems and Equipment for Local Area Networks which Provide a Non-Guaranteed Quality of Service, Jan. 30, 1996.*

* cited by examiner

*Primary Examiner*—Melvin Marcelo (57) ABSTRACT

A method and apparatus for transporting Asynchronous Transfer Mode protocol cells over an Internet Protocol backbone network is disclosed herein. ATM signaling cells are initially received at a source gateway interconnected to the IP backbone. The signaling message is converted to an H.323 message and transmitted to a controller which provides ATM to IP address translation. The corresponding IP address is received at the source gateway and ATM bearer cells of the same call as the original ATM signaling cell are encapsulated with IP headers which include the IP address to form an IP packet which keeps the ATM cells intact within the packet. The IP packet is transferred onto the IP backbone network and routed to the appropriate destination gateway where the IP packets are decapsulated to retrieve the original ATM bearer cell.

10 Claims, 6 Drawing Sheets

METHOD AND APPARATUS FOR TRANSPORTING ATM CELL TRAFFIC OVER IP NETWORKS

FIELD OF THE INVENTION

The present invention relates to the field of telecommunications networks and more specifically to a method and apparatus for transporting ATM cell traffic over IP based networks.

BACKGROUND OF THE INVENTION

In the realm of broadband network communication two competing, and largely incompatible transport protocols—Asynchronous Transfer Mode (ATM) and Internet Protocol (IP)—have each developed substantial adherents among the user community, with large traffic bases deployed for each protocol. Networks using the ATM protocol are connection oriented, offer quality of service guarantees, and are generally thought to offer a slight performance advantage over IP-based networks, particularly for voice traffic. However, IP-based networks, which are connectionless, offer variable packet sizes which in some cases provides an advantage over the fixed packet size of ATM. Moreover, legacy data traffic is, in large part, based on the IP protocol.

While it is generally reasonable and practical to configure local networks for the transport of one or the other of these competing protocols, the substantial incompatibility between the two protocols creates a problem for backbone networks which may interconnect both ATM-based local networks and IP-based local networks—essentially, ATM traffic cannot by handled by an IP network and vice versa. Although it might be possible to address that problem by the construction of duplicate ATM-based and IP-based backbone networks, that is an obviously inefficient approach and would substantially increase the cost of communications over such backbone networks.

One approach to this problem, based on the assumption of an ATM-based backbone network, has been the development of methods and proposals for transmitting IP traffic over such an ATM backbone network. Among such proposals is that of the Internet Engineering Task Force (IETF) Request for Comments (RFC) 1577 and RFC 1843. Two other approaches have been developed by the ATM Forum: (1) Local Area Network Emulation (LANE) and (2) Multi-Protocol Over ATM (MPOA).

At the same time, proponents of IP-based network transport have continued to address perceived limitations in IP, relative to ATM. In particular, quality of service issues within IP networks are being addressed with proposals such as the IETF's Resource Reservation Setup Protocol (RSVP), and its proposed Differential Services and Multi-Protocol Label Switching (MPLS). Moreover, with the availability of gigabit, and in the near future, terabit, routers, both transmission latency and quality-of-service guarantees on the order of those achieved by ATM backbone networks can be met by IP networks. It is also noteworthy that major U.S. communications carriers, such as Qwest and Level 3, are implementing IP backbone networks.

Thus, given the likelihood that IP-based backbone networks will be in use for some considerable time into the future, there is a need for a means to transport ATM-based traffic via an IP-based backbone network.

SUMMARY OF THE INVENTION

A system and method are provided for transporting Asynchronous Transfer Mode protocol cells over an Internet Protocol backbone network. According to the invention, ATM signaling cells are initially received at a source gateway interconnected to the IP backbone network. At the source gateway, the ATM signaling message is converted to an intermediate message protocol and transmitted to a controller which provides a translation between the ATM address and an address of a destination gateway interconnected with the IP backbone which is operable to forward a received IP packet to an ATM network (or switch) serving that ATM address. The translated IP destination gateway address is then returned by the controller to the source gateway. ATM data cells of the same call as the original ATM signaling cell are thereupon encapsulated with IP headers which include the translated IP destination gateway address to form an IP packet which keeps the ATM cells intact within the packet. The IP packets are transferred onto the IP backbone network and routed to the addressed destination gateway where the IP packets are decapsulated to retrieve the original ATM data cells. The decapsulated ATM cells are then routed by the destination gateway to an ATM network (or switch) serving the destination ATM address.

BRIEF DESCRIPTION OF THE DRAWINGS

A more complete understanding of the present invention may be obtained by considering the following description in conjunction with the drawings in which.

DETAILED DESCRIPTION

The complexities of interoperating IP and ATM over an IP based network originate from major differences between the two protocols. First, ATM is a connection oriented protocol while IP is a connectionless protocol. In ATM based networks, a virtual connection must be established via a signaling message between the source and destination parties before any data can be transmitted between the parties. Once the connection is established all data, consisting of bearer messages between the parties, is transmitted along the connection path. In contrast, IP based networks are connectionless. Each IP packet is routed independently by routers on a hop-by-hop basis in an IP based network.

Second, Quality of Service is an important facet of ATM networks. Various traffic is accorded different priorities with strict bandwidth and delay requirements. Therefore, bandwidth and delay requirements of a proposed virtual connection are requirements for the signaling messages that are transmitted to establish a connection within the ATM network. In contrast, IP packets are forwarded by routers on a best efforts basis.

Third, there is no algorithmic relation between an ATM address and an IP address on a network allowing for easy translation of addresses. Thus, the address translation must be done on an address-by-address basis by a lookup table.

One approach for transporting ATM traffic on an IP backbone would be to terminate the ATM protocol at a gateway into the IP backbone network and to convert the data content of the ATM packets into IP packets. A major disadvantage of such an approach is that ATM cells belonging to different calls or streams will have to be interleaved at the gateway and therefore the gateway will require a large buffer to reassemble the IP packets from interleaved ATM cells. This implementation would result in expensive routers with large storage requirements and large delays. Moreover, the resulting bottlenecks may create delays for some of the higher priority ATM traffic.

The invention provides a new and more efficient approach. Instead of terminating the ATM protocol at a gateway into the IP backbone, the ATM cell is encapsulated within a Transmission Control Protocol/Internet Protocol (TCP/IP) header or a User Datagram Protocol/Internet Protocol (UDP/IP) header. TCP and UDP are two high-level protocols used for physical transmission of packets over an IP backbone. The methodology of the invention utilizes a plurality of gateways and a controller all interconnected through the IP backbone network. At a source gateway to the IP backbone, a signaling message for an ATM call is received and forwarded to the controller, where a translation is made between the address for the ATM call and an IP address for a destination gateway which provides an interconnection to the ATM network serving that ATM address. The translated ATM/IP address is then returned to the source gateway, which uses that translated address in the header of IP packets which are formed to encapsulate the ATM data cells for that ATM call. Such IP-encapsulated ATM cells are then forwarded across the IP backbone to be addressed IP destination gateway. At that destination gateway, the IP packets are decapsulated to retrieve the original ATM data cells. The decapsulated ATM cells are then routed by the destination gateway to an ATM network (or switch) serving the destination ATM address.

Figure 1:
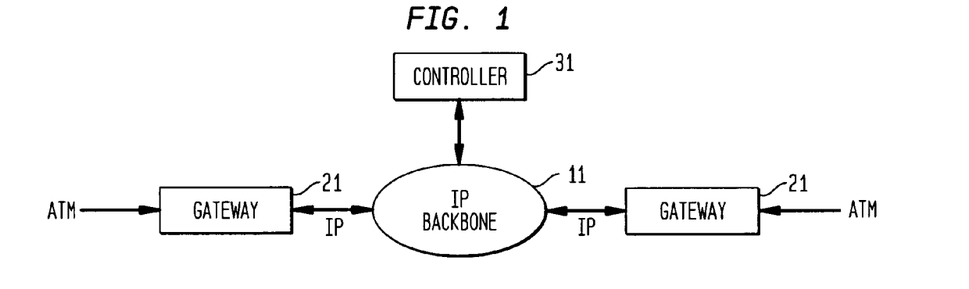
FIG. 1 is a schematic block diagram of an illustrative embodiment of the network of the invention.

Referring to FIG. 1, there is shown a schematic block diagram of an embodiment of the present invention. Coupled to an IP backbone 11 are a plurality of gateways 21 which receive ATM cells and IP packets to be routed into the IP backbone and conversely receive IP packets from the IP backbone to be routed to an appropriate ATM or IP endpoint (not shown). A controller 31 interconnected with each gateway through the IP backbone controls the overall gateway operation. It should be noted that various segments of the IP backbone can be implemented using any of a variety of transmission facilities such as fiber, copper or air as the transmission medium.

An ATM cell arriving at a gateway will be encapsulated within an IP protocol and will be routed to the IP backbone. An overview of that process follows. When an ATM User to Network Interface (UNI) signaling message is received at the gateway, the gateway transmits a signal to the controller by an intermediate signaling protocol. ATM bearer operations, that is, data operations, are performed at the gateways by encapsulating each ATM cell within either a TCP/IP header or a UDP/IP header for upstream traffic and decapsulating any received TCP/IP or UDP/IP header to extract the original ATM cell for downstream traffic.

Figure 2:
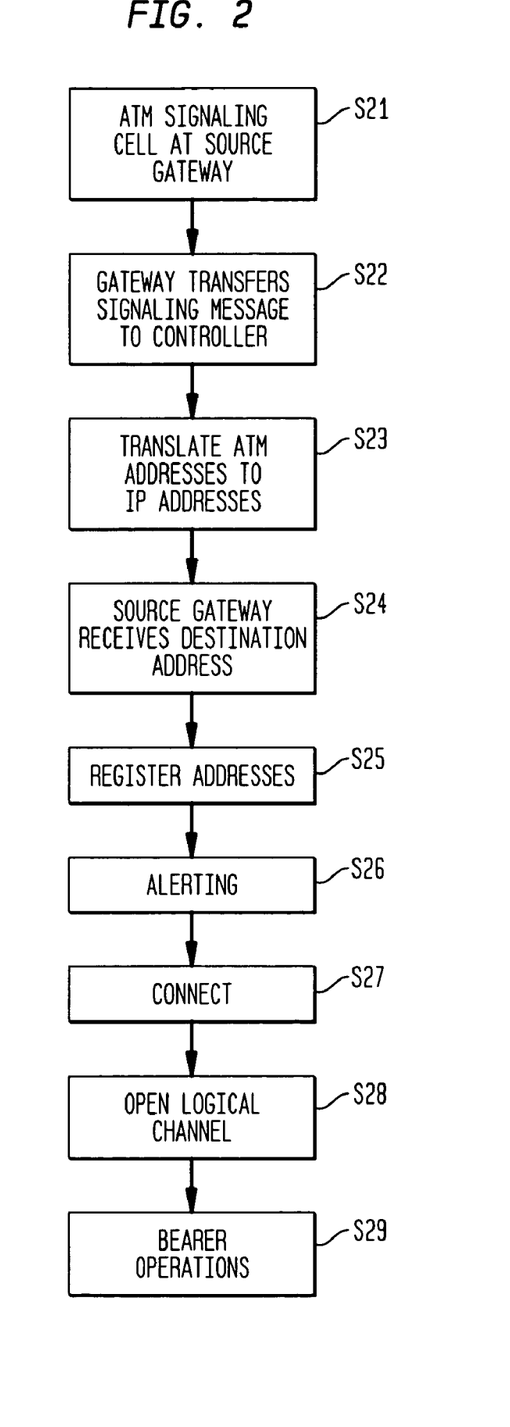
FIG. 2 is a flowchart diagram of an ATM signaling operation implemented in accordance with the invention.

Referring to FIG. 2, there is shown a flowchart diagram of an ATM signaling operation implemented in accordance with the invention. Upon receipt of an ATM signaling message in step S21, the source gateway terminates the ATM signaling message and converts the message to an intermediate signaling protocol and transfers the signaling message to the controller in step S22. For a preferred embodiment, the intermediate signaling protocol between the gateway and the controller is based on ITU recommendation H.323. H.323 is an umbrella recommendation from the International Telecommunications Union (ITU) that sets standards for multimedia communications over IP-based networks that do not provide for guaranteed Quality of Service (QoS) and is particularly appropriate for certain classes of ATM traffic.

The controller provides a translation function for translating the ATM destination address to an IP destination address by way of a look-up table in step S23. This allows the IP addresses and the ATM addresses to be completely independent of each other. After performing that translation, the controller then transmits an H.323 signaling message to the originating gateway which includes the IP address of the destination gateway in step S24. The source and the destination gateways register their addresses with the controller in step S25. Subsequently, the destination gateway alerts the source gateway that the destination gateway has alerted the end user of the ATM call in step S26. The source and the destination gateways subsequently attempt to connect in step S27 and open a logical channel in step S28. Step S29 indicates that bearer operations are ready to commence between the source and the destination gateways.

The source and destination gateways will then exchange the necessary signaling messages to each other to establish the "call." The signaling messages between the source and the destination gateway is similar to the H.323 protocol, which uses the ITU Q.931 signaling format. In the present invention, the messages exchanged between the source gateway and the destination gateway are a modification to the H.323 protocol using the ITU Q.2931 signaling format (rather than the ITU Q.931 signaling format) and closely resembles the ATM User-to-Network Interface (UNI) signaling format.

Figure 3:
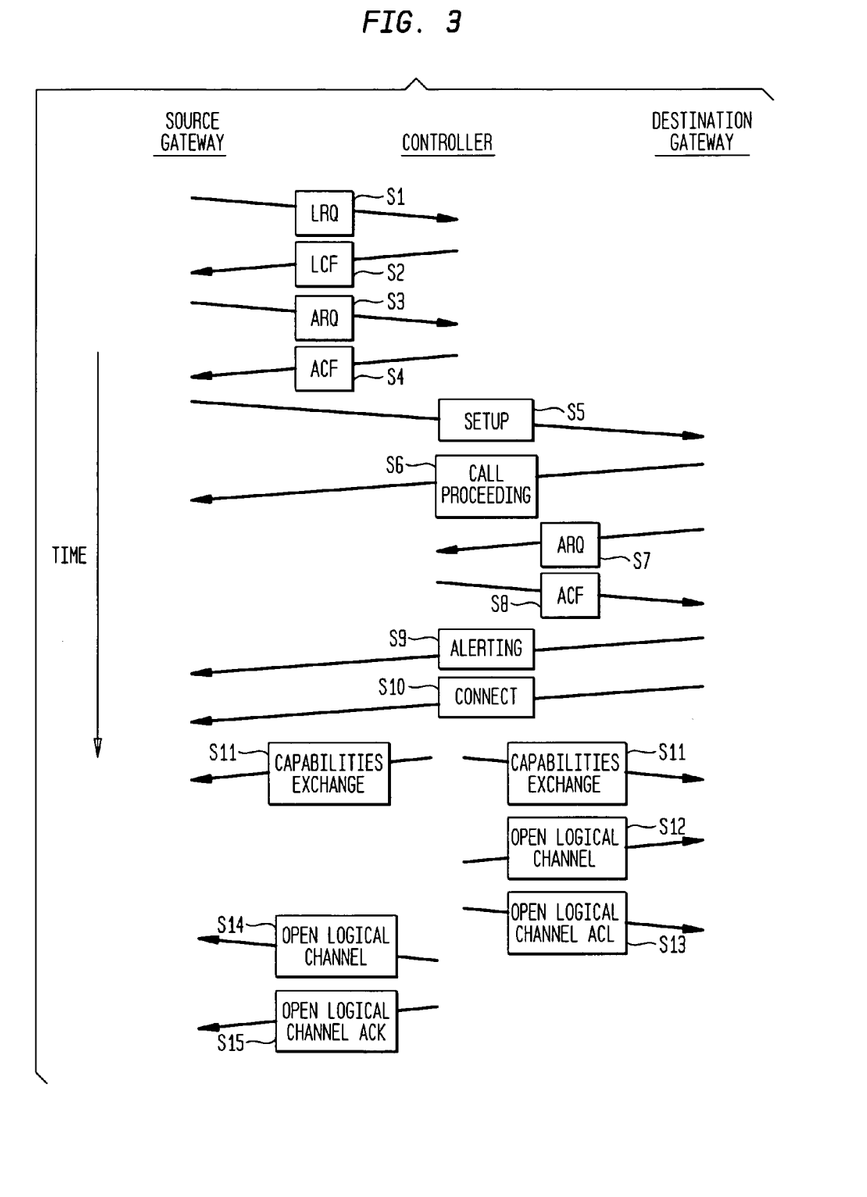
FIG. 3 is a detailed call flow diagram of an ATM signaling operation implemented in accordance with the invention.

Referring to FIG. 3, there is shown a detailed call flow diagram illustrating the procedure followed for transmission of ATM traffic over the IP backbone. Once an ATM signaling message arrives at the source gateway to the IP backbone network, steps S1 and S2 are followed for finding the IP address of the proper destination gateway. A Location Request (LRQ) message is transmitted using the H.220 protocol to the controller of the IP backbone. The controller consults a look-up table for the IP gateway corresponding to the destination ATM address and transmits an Location Confirmation (LCF) message back to the source gateway, again using the H.220 protocol. After the LCF message is received by the source gateway, an Address Registration message is sent to the controller, in step S3, using the H.220 protocol. The controller registers the address of the source gateway via a series of Automatic Retransmission Request (ARQ) commands in step S3 and issues an Automatic Retransmission Confirmation (ACF) command issued to the source gateway in step S4.

A Q.2931 setup message is then sent from the source gateway to the destination gateway in step S5. The Q.2931 setup message transports relevant calling parameters including the virtual channel and virtual path (VCI/VPI) information element used to assign ATM virtual channels between the source gateway and the destination gateway. An H.220 call proceeding message is subsequently sent from the destination gateway to the source gateway. The message informs the source gateway that call setup is in progress in step S6.

The destination gateway also sends an ARQ message to the controller to register the destination gateway address and to check whether the destination gateway may be allowed to take the call in step S7. An ACF message transmitted in step S8 confirms that the destination gateway is allowed to take the call. In step S9, an alerting message is sent from the destination gateway to the source gateway to inform the source gateway that the destination gateway has contacted the end user by "ringing" on the destination side. A connect message is sent in step S10 from the destination gateway to the source gateway when the called party "answers." In step S11, a series of H.245 messages are used to exchange capabilities, such as bandwidth, between the source and the destination gateway.

In step S12, an Open Logical Channel Message is transmitted from the destination gateway to the controller. That message is a request to open an H.245 protocol logical channel dedicated to data transmission between the source gateway and the destination gateway. In step S13, the controller acknowledges the opening of the logical channel. Similarly, in steps S14 and S15, H.245 protocol logical channels are requested and granted by the controller to the source gateway. Once the logical channels have been established, the IP bearer packets can be transmitted and received between the source and destination gateways.

Figure 5:
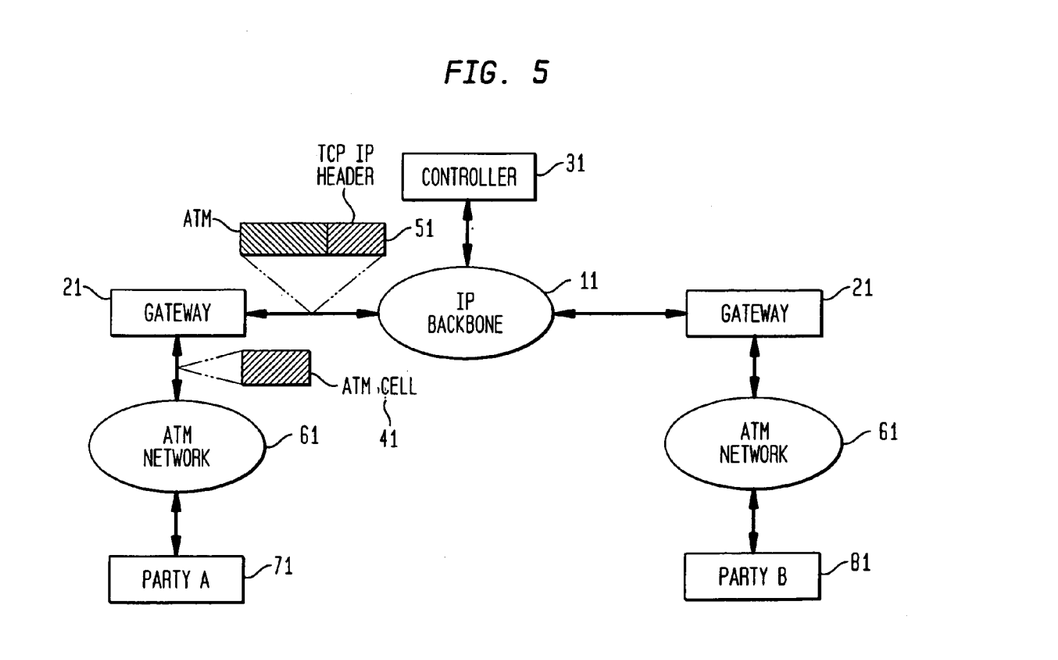
FIG. 5 is a schematic block diagram of an exemplary implementation of an ADSL derived POTS in accordance with the invention.

Referring to FIG. 5, there is shown a schematic block diagram of ATM bearer operation implemented in accordance with the invention. A call is established between two parties, for example, Party A 71 and Party B 81, by signaling messages exchanged between gateways via the IP backbone 11 in accordance with the previously described procedure. Once the call has been established, the gateways 21 will transmit IP packets 51, which include encapsulated ATM cells 41. ATM formatted cells of 53 bytes are completely enclosed within Transmission Control Protocol (TCP/IP) headers or User Datagram Protocol (UDP/IP) headers for transmission over the IP backbone 11. The IP header includes the translated ATM address received from the controller by the source gateway so that the packet is properly addressed with the IP address corresponding to the destination ATM address. Upon receiving an IP packet containing an ATM cell, the destination gateway will extract the ATM cell by means of decapsulating the IP header and transmitting the newly extracted ATM cell to the appropriate endpoint through the ATM network 61 serving the addressed party.

A conventional method of terminating and buffering ATM cells to assemble the full ATM stream from interleaved traffic was illustrated earlier in the Detailed Description. It should be noted that unlike such a conventional method, the present invention requires only a very small buffer at the gateway since the full ATM stream does not need to be assembled at each gateway. The complexity and the cost of each gateway is therefore reduced in the present implementation.

Figure 4:
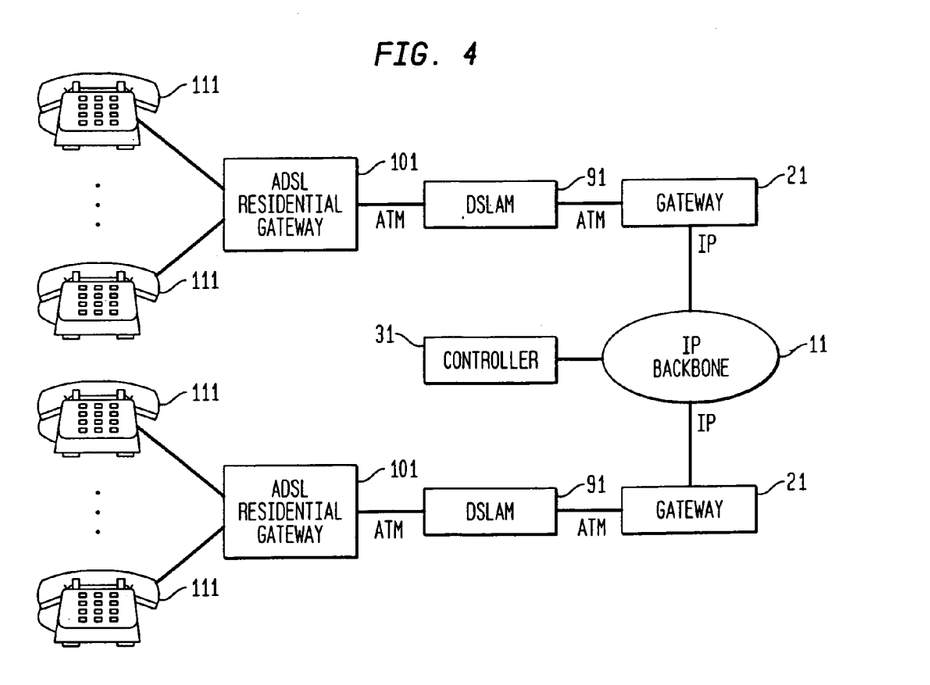
FIG. 4 is a schematic block diagram of an implementation of ATM bearer operation in accordance with the invention.

To further explain the methodology of the present invention, exemplary applications of that methodology for different IP based networks follow. One such exemplary embodiment, a Plain Old Telephone System (POTS) implemented using an Asynchronous Digital Subscriber Line (ADSL) is illustrated in FIG. 4. Referring to FIG. 4, an ADSL Residential Gateway 101 resides at the residential premises where a user of the system is equipped with an ADSL modem. A Digital Subscriber Line Access Multiplexer (DSLAM) 91 multiplexes many ADSL residential lines to a single ATM line which is interfaced to a gateway 21 of the present invention. The DSLAM 91 typically resides at the local loop and routes traffic from residential users to the Public Switched Telephone Network (PSTN) and to Internet Service Providers (ISP). In this exemplary embodiment, the gateway 21 is assumed to be located at an Internet Service Provider (ISP). It should be understood however that the gateway can be located at any location where there is an interface to the IP backbone. The gateway 21, without terminating the ATM protocol, can use the IP backbone network to transfer the ATM cells encapsulated in IP headers according to the methodology of the invention.

Once a user at the transmitting end picks up the telephone set 111 (off-hook), the Residential Gateway 101 will convert the signaling information from the user's telephone (or ADSL modem) to an ATM signaling message and transmit the signaling message to the gateway 21 of the invention via the DSLAM interface 101. The gateway 21 terminates ATM UNI-signaling, converts the signaling cell to an H.323 protocol message and transfers the cell as an IP packet to the controller 31. The controller 31, via a lookup table, obtains the IP gateway address of the ATM destination address from the cell and transmits the information to the originating gateway by means of an H.323 response message.

Subsequent to the signaling operation, a call will be established from the source gateway 21 to the destination gateway 21 by means of interchanging Q.2931 protocol messages via the controller intermediary. After call establishment, the gateways 21 will encapsulate the received ATM bearer cells from users with appropriate TCP/IP or UDP/IP headers and transfer the encapsulated ATM cells to the destination gateways 21 through the IP backbone 11. The destination gateway 21, upon receiving an IP bearer packet from the IP backbone, will extract the ATM cell from the packet by decapsulating the header and transfer the enclosed ATM cell to its endpoint via a DSLAM 101 at the destination end.

Figure 6:
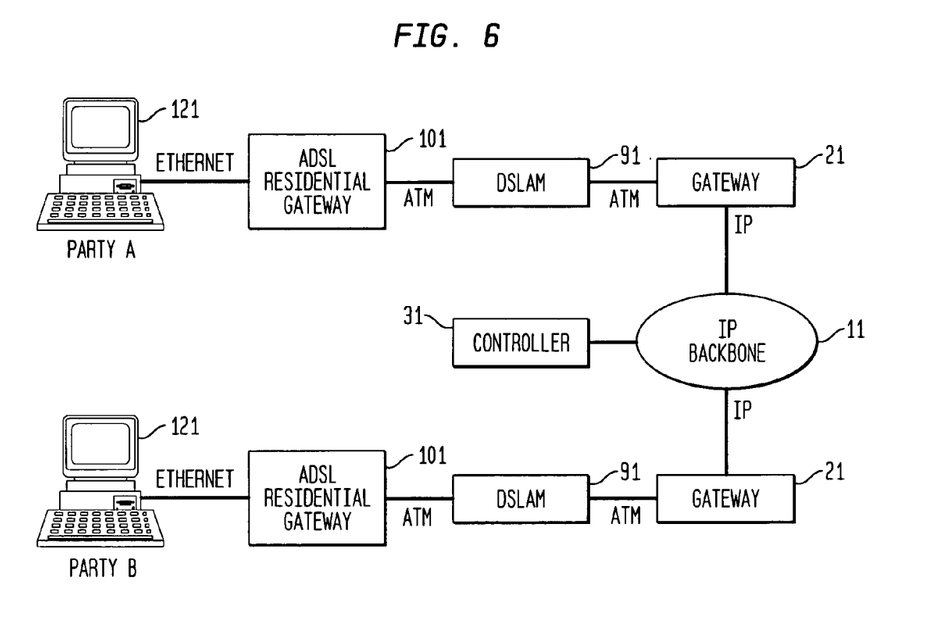
FIG. 6 is a schematic block diagram of an exemplary implementation of an IP collaboration scheme using ADSL access in accordance with the invention.

Another exemplary application of the method of the invention, an implementation of IP collaboration using ADSL, will be illustrated in FIG. 6. Referring to that figure, there is shown a block schematic diagram of an IP collaboration scheme using ADSL access in accordance with the principles of the present invention. Party A and Party B 121 are two residential endpoints that would like to engage in a call using a data collaboration application such as Whiteboard or Document Sharing software. Both Party A and Party B may be connected to their Residential Gateways 101 by, for example, an Ethernet connection. The data collaboration software application may use TCP or UDP protocols to transmit and capture IP packets. Upon receiving an IP packet from the source endpoint 21, the residential gateway 101 will segment the IP packet into ATM cells with an appropriate priority such as ATM Adaptation Layer 5 (AAL5) using the IETF RFC 1483 recommendation and transfer the cells to the gateway via the DSLAM 91.

Subsequently, Residential Gateways 101 will use ATM UNI signaling to communicate with their gateways 21. Upon receiving a call setup signaling message from the user, the gateway 21 will terminate the ATM signaling protocol and construct an H.323 IP signaling packet and send the packet to the controller 31 of the invention.

Subsequent to call setup, the controller 31 will translate the destination gateway address from the ATM cell and transfer the packet to the source gateway 21 by means of a response message. The source and destination gateways will establish the call by means of converting an ATM UNI signaling from the users to the H.323 format and transfer the H.323 messages to each other. Subsequent ATM bearer cells will be encapsulated at the gateway 21 with either a TCP/IP or UDP/IP header and be transferred to the destination gateway 21 through the IP backbone network 11. At the destination gateway, the IP bearer packet will be decapsulated to retrieve the original ATM cell and will be transferred to the destination endpoint 121. At the destination endpoint, the original ATM cells will be reassembled and transferred to the user. It is noted that those who are skilled in the technology can make modifications to this exemplary embodiment such as modifying the above example with one of the parties being directly connected to the IP backbone. Other applications such as multi-player gaming or streaming video or audio applications are also possible with modifications to the above-described example.

Although the present invention is described in various illustrative embodiments, it is not intended to limit the invention to the precise embodiments disclosed herein. Accordingly, this description is to be construed as illustrative only. Those who are skilled in this technology can make various alterations and modifications without departing from the scope and spirit of this invention. Therefore, the scope of the present invention shall be defined and protected by the following claims and their equivalents. The exclusive use of all modifications within the scope of the claims is reserved.

What is claimed is:

1. A system for establishing a dedicated channel to transport IP encapsulated ATM cells from one ATM network associated with a source gateway to another ATM network associated with a destination gateway over an IP backbone network without appending a header to each formatted frame of each cell, the system comprising:
    a source gateway interconnected to the IP backbone network, said source gateway operable to;
    transmit an IP signaling message requesting an IP address of a proper destination gateway to a controller upon receipt of an ATM signaling message from an ATM end point;
    receive the IP address from the controller confirming the address of the proper destination gateway from the controller;
    transmit an address registration message to the controller to register the source gateway;
    exchange set-up messages with the proper destination gateway to transport IP encapsulated ATM cells associated with a call; and
    transmit an open logical channel request message to the controller to request the establishment of a dedicated channel between the source gateway and the destination gateway to transport the IP encapsulated ATM cells.

2. The system of claim 1 wherein the ATM signaling message is an ATM UNI signaling message.

3. The system of claim 1 wherein the IP signaling message follows the H.323 protocol.

4. A system for establishing a dedicated channel to transport IP encapsulated ATM cells from one ATM network associated with a source gateway to another ATM network associated with a destination gateway over an IP backbone network without appending a header to each formatted frame of each cell comprising:
    a destination gateway interconnected to the IP backbone network, said destination gateway operable to;
    transmit an automatic retransmission request to a controller to register the destination gateway and to determine whether the destination gateway may receive IP encapsulated ATM cells associated with a call from a source gateway;
    receive a confirmation message from the controller confirming the destination gateway may receive the ATM cells;
    exchange set-up messages with a source gateway to transport the IP encapsulated ATM cells over the IP backbone network;
    transmit an open logical channel request message to the controller to open a dedicated channel between the destination gateway and the source gateway;
    transmit an alert message to the source gateway to inform the source gateway that an ATM endpoint has been alerted about the call; and
    transmit a call proceeding message to the source gateway.

5. A system for establishing a dedicated channel to transport IP encapsulated ATM cells from one ATM network associated with a source gateway to another ATM network associated with a destination gateway over an IP backbone network comprising without appending a header to each formatted frame of each cell:
    a controller interconnected to the IP backbone network, said controller operable to;
    transmit an IP address of a proper destination gateway to a source gateway using an IP signaling message;
    receive an address registration message from the source gateway to register the source gateway and an automatic retransmission message from the destination gateway to register the destination gateway; and
    transmit acknowledgements to the source and destination gateways to acknowledge the opening of a logical channel between the source and destination gateways in response to receiving one or more open logical channel request messages.

6. A method for establishing a dedicated channel to transport IP encapsulated ATM cells from one ATM network associated with a source gateway to another ATM network associated with a destination gateway over an IP backbone network without appending a header to each formatted frame of each cell comprising:
    transmitting an IP signaling message requesting an IP address of a proper destination gateway to a controller upon receipt of an ATM signaling message from an ATM end point;
    receiving the IP address of the proper destination gateway from the controller;
    transmitting an address registration message to the controller to register a source gateway;
    exchanging set-up messages between the source gateway and the proper destination gateway to transport IP encapsulated ATM cells associated with a call; and
    transmitting an open logical channel request message to the controller to request the establishment of a dedicated channel between the source gateway and the destination gateway to transport the encapsulated ATM cells.

7. The method of claim 6 wherein the step of receiving the IP address from the controller is performed via a H.323 protocol message.

8. The method of claim 6 wherein the set-up messages use a Q.2931 signaling format.

9. A method for establishing a dedicated channel to transport IP encapsulated ATM cells from one ATM network associated with a source gateway to another ATM network associated with a destination gateway over an IP backbone network without appending a header to each formatted frame of each cell comprising:

transmitting an automatic retransmission request to a controller to register a destination gateway and to determine whether the destination gateway may receive IP encapsulated ATM cells associated with a call from a source gateway;

receiving a confirmation message from the controller confirming the destination gateway may receive the ATM cells;

exchanging set-up messages between a source gateway and the destination gateway to transport the IP encapsulated ATM cells over the IP backbone network;

transmitting an open logical channel request message to the controller to open a dedicated channel between the destination gateway and the source gateway;

transmitting an alert message to the source gateway to inform the source gateway that an ATM endpoint has been alerted about the call; and     transmitting a call proceeding message to the source gateway.

10. A method for establishing a dedicated channel to transport IP encapsulated ATM cells from one ATM network associated with a source gateway to another ATM network associated with a destination gateway over an IP backbone network without appending a header to each formatted frame of each cell comprising:

transmitting an IP address of a proper destination gateway to a source gateway using an IP signaling message;

receiving an address registration message from the source gateway to register the source gateway and an automatic retransmission message from the destination gateway to register the destination gateway; and     transmitting acknowledgements to the source and destination gateways to acknowledge the opening of a logical channel between the source and destination gateways in response to receiving one or more open logical channel request messages.

\* \* \* \* \*